United States Patent
Erickson et al.

(10) Patent No.: US 11,012,468 B2
(45) Date of Patent: May 18, 2021

(54) DETECTING AND RESPONDING TO ATTEMPTS TO GAIN UNAUTHORIZED ACCESS TO USER ACCOUNTS IN AN ONLINE SYSTEM

(71) Applicant: Okta, Inc., San Francisco, CA (US)

(72) Inventors: Jason Erickson, San Mateo, CA (US); Unmesh Vartak, Palo Alto, CA (US); Amogh Vasekar, San Mateo, CA (US); Gabriel Werman, San Francisco, CA (US)

(73) Assignee: Okta, Inc., San Francisco, CA (US)

( * ) Notice: Subject to any disclaimer, the term of this patent is extended or adjusted under 35 U.S.C. 154(b) by 211 days.

(21) Appl. No.: 16/175,748

(22) Filed: Oct. 30, 2018

(65) Prior Publication Data
US 2020/0137066 A1    Apr. 30, 2020

(51) Int. Cl.
*H04L 29/06*    (2006.01)
*H04L 9/32*    (2006.01)
(Continued)

(52) U.S. Cl.
CPC ........ *H04L 63/1441* (2013.01); *H04L 9/3226* (2013.01); *H04L 9/3228* (2013.01);
(Continued)

(58) Field of Classification Search
CPC ....... H04L 63/102; H04L 63/10; H04L 63/20; H04L 63/08; H04L 63/1441;
(Continued)

(56) References Cited

U.S. PATENT DOCUMENTS 8,286,227 B1 * 10/2012 Zheng ................ G06Q 20/3823
                                                                    726/6
8,904,506 B1 * 12/2014 Canavor ................ G06F 16/00
                                                                    726/7
(Continued)

FOREIGN PATENT DOCUMENTS

WO    WO 2011/049784 A2    4/2011

OTHER PUBLICATIONS

PCT International Search Report and Written Opinion, PCT Application No. PCT/US2019/058381, dated Aug. 11, 2020, nine pages.

*Primary Examiner* — Kristine L Kincaid
*Assistant Examiner* — Shaqueal D Wade
(74) *Attorney, Agent, or Firm* — Fenwick & West LLP

(57) ABSTRACT

In response to detected attempts to gain unauthorized access to user accounts of an online system, a security module of an online system applies an attack response policy to take actions in response to the attempts. Possible responses of the policy include reordering credential types requested by the online system during multi-factor authentication-enabled login, switching to a mode in which login requests are accepted but login is not permitted for the requesting user, and logging information about the login requests. Logged information may be applied to enhance the ability to prevent future unauthorized accesses, such as adding credential values to a list of common credential values and prohibiting users from associating those values with their accounts, or training a model based on the logged information to predict a probability that a given login request is unauthorized.

20 Claims, 4 Drawing Sheets

(51) Int. Cl.
*H04W 12/06* (2021.01)
*H04W 12/122* (2021.01)
*H04L 9/00* (2006.01)

(52) U.S. Cl.
CPC ........ H04L 63/102 (2013.01); H04L 63/1425 (2013.01); H04L 63/20 (2013.01); H04W 12/06 (2013.01); H04L 9/002 (2013.01); H04L 63/08 (2013.01); H04L 63/083 (2013.01); H04L 63/1408 (2013.01); H04L 63/1483 (2013.01); H04W 12/068 (2021.01); H04W 12/122 (2021.01)

(58) Field of Classification Search
CPC ............ H04L 63/1408; H04L 63/1425; H04L 63/1458; H04L 63/105; H04L 63/1483; H04L 63/067; H04L 63/083; H04L 9/32; H04L 9/3226; H04L 9/3228; G06F 21/30; G06F 21/32; H04W 12/06; H04W 12/0608
See application file for complete search history.

(56) References Cited

U.S. PATENT DOCUMENTS

| | | | |
|---|---|---|---|
| 10,713,374 B2* | 7/2020 | Algie | G06F 3/067 |
| 10,824,705 B2* | 11/2020 | Ballard | G06F 21/34 |
| 2007/0136792 A1* | 6/2007 | Ting | G06F 21/32 726/5 |
| 2008/0201767 A1 | 8/2008 | Williams et al. | |
| 2011/0225648 A1* | 9/2011 | Channakeshava | G06F 21/46 726/18 |
| 2016/0173485 A1* | 6/2016 | Popoveniuc | H04L 63/1433 726/1 |
| 2016/0359837 A1 | 12/2016 | Krstic et al. | |
| 2017/0244683 A1* | 8/2017 | Mohamed | H04W 4/14 |
| 2018/0034823 A1 | 2/2018 | Parees et al. | |
| 2018/0046796 A1 | 2/2018 | Wright et al. | |
| 2018/0084010 A1* | 3/2018 | Joseph | H04L 63/20 |

* cited by examiner

DETECTING AND RESPONDING TO ATTEMPTS TO GAIN UNAUTHORIZED ACCESS TO USER ACCOUNTS IN AN ONLINE SYSTEM

FIELD OF ART

The present disclosure generally relates to the field of software applications, and more specifically, to detecting and responding to attempts to gain unauthorized access to user accounts on an online system.

BACKGROUND

Malicious third parties may wish to gain unauthorized access to user accounts on a computer system, e.g., to steal user information. This is a particular risk in the case of online systems, in which the accounts may be accessed by users (including unauthorized users) from essentially any location over a computer network, either manually using a graphical user interface, in an automated manner by scripting interactions with a graphical user interface, or in an automated manner using an application programming interface (API).

It would be valuable for the online systems to be able to detect attempts to gain unauthorized access, and—once detected—to be able to prevent the present access and also to gain greater ability to prevent future unauthorized accesses.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
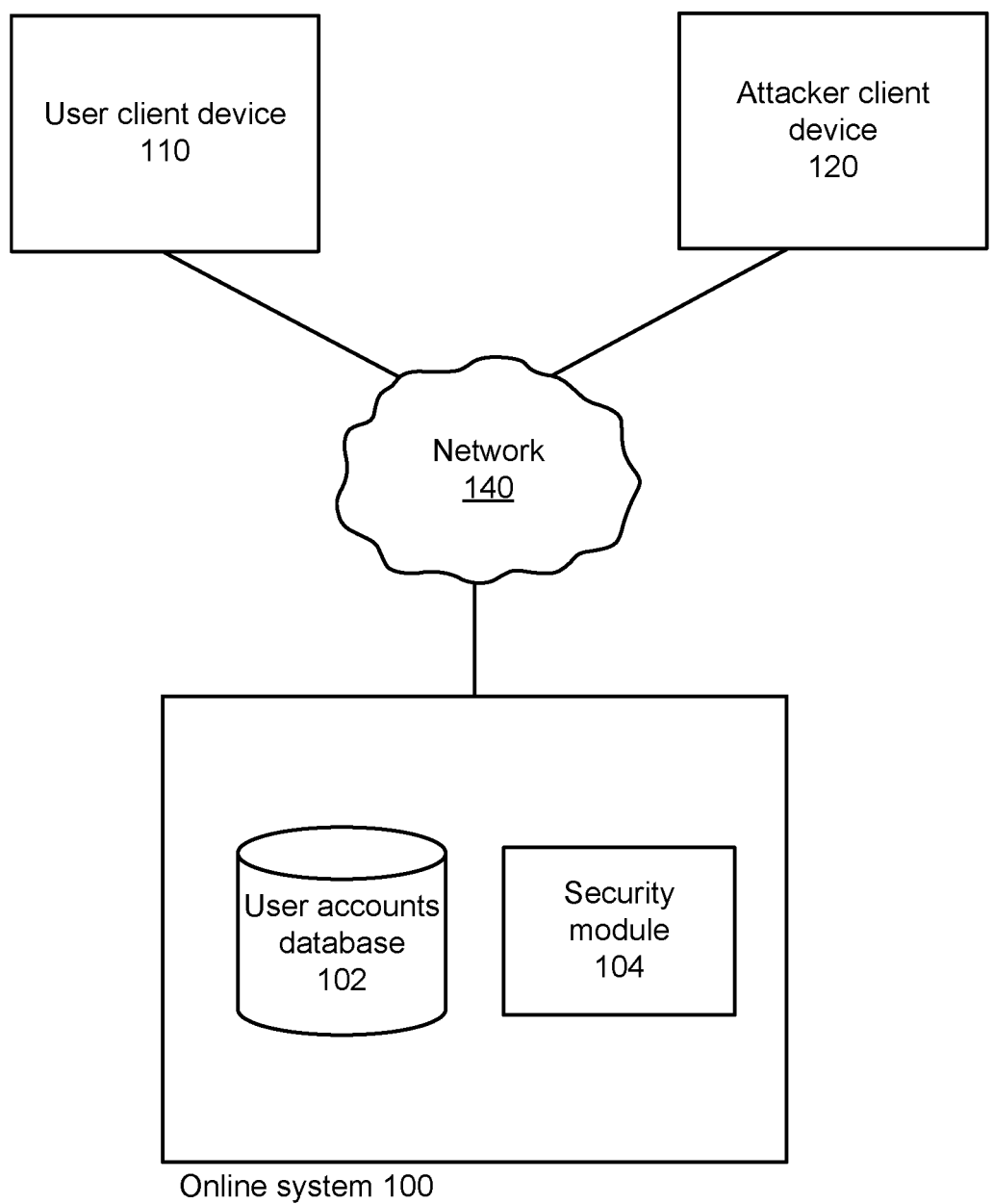
FIG. 1 illustrates one embodiment of a computing environment in which users use their client devices to log in to an online system to gain access to its functionality.

FIG. 1 illustrates one embodiment of a computing environment in which users use their client devices to log in to an online system to gain access to its functionality.

Users use their client devices 110 (e.g., desktops, laptops, tablet computers, smartphones, or the like) to gain access to an online system 100 and use its functionality. For example, the online system 100 could be the system of a company providing a web-based application or service (e.g., SALESFORCE™, GOOGLE APPS™, or the like), of a company providing users of a separate organization with single-sign on access to multiple such applications, or the like.

The online system 100 supports multiple users, providing those users with access to its functionality once the users have authorized themselves by providing their credentials. Different online systems 100 may support different types of credentials, such as usernames and passwords, biometric data such as fingerprint or iris scan data, values generated by a hardware security token, or multifactor authentication using two or more credential types. Information about the users and their credentials is stored in the user accounts database 102. For example, for some online systems 100 the user accounts database 102 might store a list of all the usernames of users of the systems, and for each username, a corresponding set of credential information (e.g., an (encrypted) password, a biometric fingerprint, a phone number for sending an SMS code, or a seed for generating token values), as well as any other information about the user tracked by the system.

Since login is available to users over the network, there may also be attackers who user their own client devices 120 to attempt to gain unauthorized access to accounts of legitimated authorized users of the online system 100, e.g., by attempting to guess user passwords using common password values.

To address such attackers, the online system 100 uses a security module 104, which is described in more detail with respect to FIG. 2, below.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Although for simplicity FIG. 1 illustrates exactly one user client device 110 and one attacker client device 120, there may be any number of each.

Figure 2:
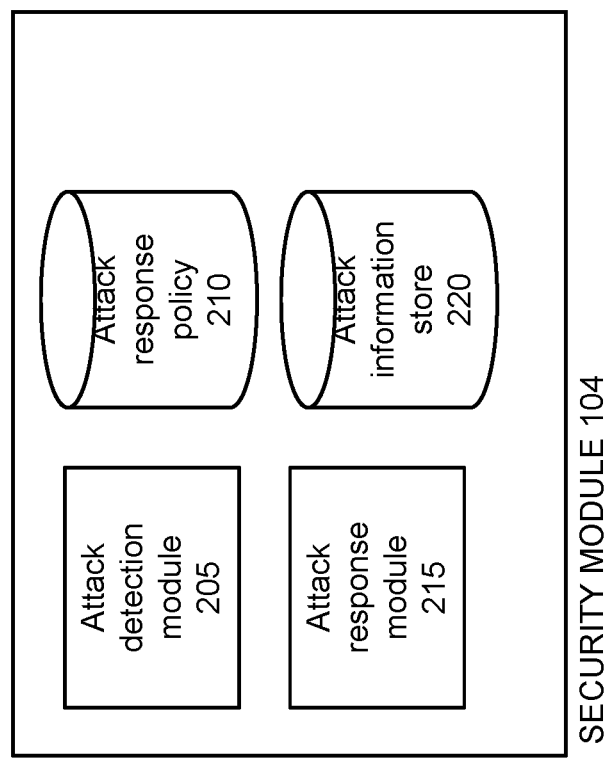
FIG. 2 is a high-level block diagram illustrating a detailed view of the security module of the online system of FIG. 1, according to one embodiment.

FIG. 2 is a high-level block diagram illustrating a detailed view of the security module 104 of the online system 100, according to one embodiment.

In some embodiments, the security module 104 includes an attack detection module 205 that determines whether an attack on user accounts is taking place (that is, whether an unauthorized user is attempting to gain access to accounts of legitimate users). One common type of attack is "password spraying," in which an unauthorized user attempts to login to different user accounts with the same set of common passwords, hoping that at least one of the users will have used one of the common passwords. For example, an unauthorized user might attempt to log in to a set of users accounts, each using the same common password (e.g., "123456," "opensesame," or the like). Some attacks may generate usernames, or use common usernames (e.g., "j smith"), or rely on knowledge of names of members of the organization(s) in question (e.g., the known member "John Smith" being presumed to have the username "j smith" or "john.smith" or the like), rather than first determining actual usernames of the online system 100.

In some embodiments, the attack detection module 205 determines that an attack is taking place by applying a specific algorithm, such as determining whether the same IP address is the source of at least some predetermined threshold number of login attempts, spread out over at least some predetermined threshold number of usernames, over some predetermined threshold period of time. In other embodiments, the attack detection module 205 applies an attack detection model (not illustrated in FIG. 2) that is trained using a supervised machine learning algorithm. In such embodiments, the training set of login requests considered to constitute attacks consists of login requests satisfying criteria indicating extremely high likelihood of attack (e.g., over 500 prior attempts at login by the same IP address within the past minute). The features of a login request used in the training include, in various embodiments: IP address of the login request, HTTP user-agent (browser) of the login request, day of the login request, time of day of the login request, and/or whether the login request was made via an API or a graphical user interface). After the training of the attack detection model, the attack detection module 205 then extracts the same features from new login requests, and applies the model to those features, obtaining as output a confidence score indicating the probability that the login request is an attack. Confidence scores meeting a given threshold value may be considered to constitute an attack.

In some embodiments, the attack detection module 205 determines whether an attack is occurring based on analyzing the IP address of the current login request (e.g., whether that IP address has been frequently attempting and failing login in the recent past). In other embodiments, the attack detection module 205 analyzes the HTTP user-agent in combination with other information identifying the user. In other embodiments, where the online system 100 is a multi-tenant system (e.g., a single-sign on (SSO) system) that acts on behalf of multiple tenants (e.g., different companies and their associated users constituting different tenants), the attack detection module 205 analyzes the tenant for which login is being requested (e.g., for a user belonging to a particular tenant). The determination of whether an attack is occurring may be specific to the particular action to be taken. For example, analyzing the entire tenant may be appropriate when determining whether to employ reordering of multifactor authentication (described below), but not for other types of actions.

The security module 104 includes an attack response policy 210 that specifies what actions to take in response to a login request determined to constitute an attack. The attack response policy 210 may be specified by a system administrator or other employee of the online system 100, and may specify that the actions are conditional upon other variables, such as whether multifactor authentication (MFA) is being employed, the probability of attack as determined by an attack detection model, or the like.

For example, the attack response policy 210 may specify that MFA reordering should be employed in response to an attack. This technique is appropriate when MFA security is being employed for the user to whose account access is being requested. In some embodiments, the technique is employed when the attack detection module 205 determines that a particular login request is likely, but not certainly, an attack. For example, the attack detection module 205 may determine that the probability that the login request is at least a first threshold, but less than a second threshold (e.g., at least 70% likely, but less than 95% likely), that at least N, but fewer than M, consecutive failed login attempts have originated at the same IP address (for N<M), or the like. For instance, MFA reordering might be employed after N=100 failed login requests from the same IP address (at which point it is considered likely that the IP address constitutes an attacker), but before M=500 failed login attempts (at which point it is considered essentially certain that the IP address constitutes an attacker). In some embodiments, N may be randomly selected from some range (e.g., from 50 to 150 attempts), so as to make it more difficult for attackers to determine that their attack has been detected.

When MFA reordering is employed, the online system 100 switches from requesting, from a user attempting login, a first type of credential (e.g., a password) to requesting a second type of credential (e.g., a code sent to a secondary device using a time-based one-time password (TOTP)). As one specific example, rather than continuing to request a password (or a <username, password> pair) from the user after 100 failed attempts at entering the password, the online system 100 switches to requesting that the user enter a code sent via TOTP. In some cases, the second type of credential is more difficult for an unauthorized user to provide than the first type of credential (e.g., TOTP being more difficult to guess than a password). Switching to requesting a second type of credential has the benefit of typically making it more difficult for an attacker to provide the correct credential values (assuming that the attacker has a good strategy for attacking the first type of credential, but not the second type of credential), without the burden of forcing the requesting user (who possibly is not an attacker) to provide all the types of credentials on every login attempt. This results in a more pleasant user experience, while still providing strong security. Another benefit is that an "innocent" user mistakenly determined by the attack detection module 205 to likely be attempting unauthorized access is still capable of logging in, although they are required to provide all the configured credential types. The switching of credential type order also prevents an attacker from correctly determining the value for the (more easily-determined) first type of credential. Determination of the correct value for the first type of credential can be detrimental to the true user, even though to access the online system 100 will require an attacker to guess values of additional types of credentials, because even partial information can be leveraged later. For example, the true user's password on the online system 100, once guessed, may be used to gain access to accounts of the user on other systems, in cases where the true user re-uses his or her passwords.

Another possible type of response specified by the attack response policy 210 is switching to a login mode in which login requests are still accepted, but in which login will not be permitted for the requesting user (at least within a given timeframe), regardless of whether the requesting user provides the correct credentials. This provides a number of benefits: First, it prevents an attacking user from eventually gaining access to user accounts through sheer number of attempts. Second, it prevents the attacking user from realizing that the attack has been detected, which in turn prevents the attacker from switching to a different type of attack, or ceasing to provide credential values to the security module 104. Third, it allows the security module 104 to collect information about the login requests (which are presumed to constitute attacks) and store it in an attack information store 220.

Still another possible type of response specified by the attack response policy 210 is collecting and logging information about the (presumably unauthorized) login request. In some embodiments, the collected information is used to train the attack detection model discussed above. In some embodiments, the collected information includes the IP address from which the login request originated, the day of the login request, the time of the login request, the frequency of login requests (e.g., number of prior login requests over some prior time period) by the same IP address, the values of the credentials submitted (e.g., the particular username and password), or the like.

In some embodiments in which the security module 104 does not employ fuzzy matching to generate variants of known common credentials, the attack information store 220 stores a hash of the submitted credential values, rather than the values themselves, thereby increasing user privacy. (Fuzzy matching may be useful in systems which have only small sets of known common credentials, but it becomes less useful for larger sets of known common credentials, such as result from capturing attempted credentials in the attack information store 220.) The credential value hash may be associated with a count of the times that the credential value was used (e.g., a count of the unique user identifies for which the credential value was used).

In some embodiments, once a credential value (e.g., a password) has been submitted a given amount (e.g., for N different users, such as N>=50), it is considered a commonly-attempted credential value and placed in a common credentials store (not illustrated in FIG. 2). The online system 100 may then reject requests of its users to use credential values in the common credentials store (e.g., reject requests of users to make their accounts accessible via common passwords), so as to make their accounts more difficult to attack. Thus, when a user of the online system 100 attempts to set a credential of the user's account to one of the credential values in the common credentials store, the online system disallows it and requires the user to select another credential value. Additionally, the online system 100 may issue a warning to those of its users to whose accounts access was requested using the commonly-attempted credentials.

In some embodiments, the attack response policy 210 indicates that in addition to logging information about the presumably unauthorized login requests, properties defining a user group being attacked should be determined. Specifically, users are identified to whose accounts login was requested by the apparent attacks, and one or more properties defining a user group including those attacked users is determined. For example, based on the specific users being attacked, it might be determined that executives of a particular organization are being targeted (where the property defining the user group is that job title of the users, with a value indicating executive status). A defensive policy measure is then implemented to some or all of the accounts of the users of the user group defined by the determined properties (e.g., all executives of an organization), e.g., so as to reduce the risk of unauthorized access to those accounts, or to make use of the accounts more usable despite the attack. For example, user accounts under attack can be set to be locked after some number of password attempts. As another example, for cases where locking of users accounts after failed logins already occurs, and where malicious locking of user accounts through intentional failed logins is the intent of the attack, a time of automatic unlocking for accounts of the user group being attacked can be reduced (e.g., from 2 hours to 5 minutes). This makes it easier to regain access to maliciously locked accounts, while still making it difficult to gain unauthorized access to the accounts through brute force attempts.

The security module 104 includes an attack response module 215 that applies the attack response policy 210 to take an action appropriate for the current context. As one example, the attack response module 215 may apply multifactor reordering if MFA is being used for the user to whose login is being requested, and if the attack detection module 205 determined that the probability that the login request is an attack is significant but not certain; otherwise, the attack response module 215 switches to a mode that allows login attempts but does not permit successful login, and collects and logs information about the login request.

Figure 3:
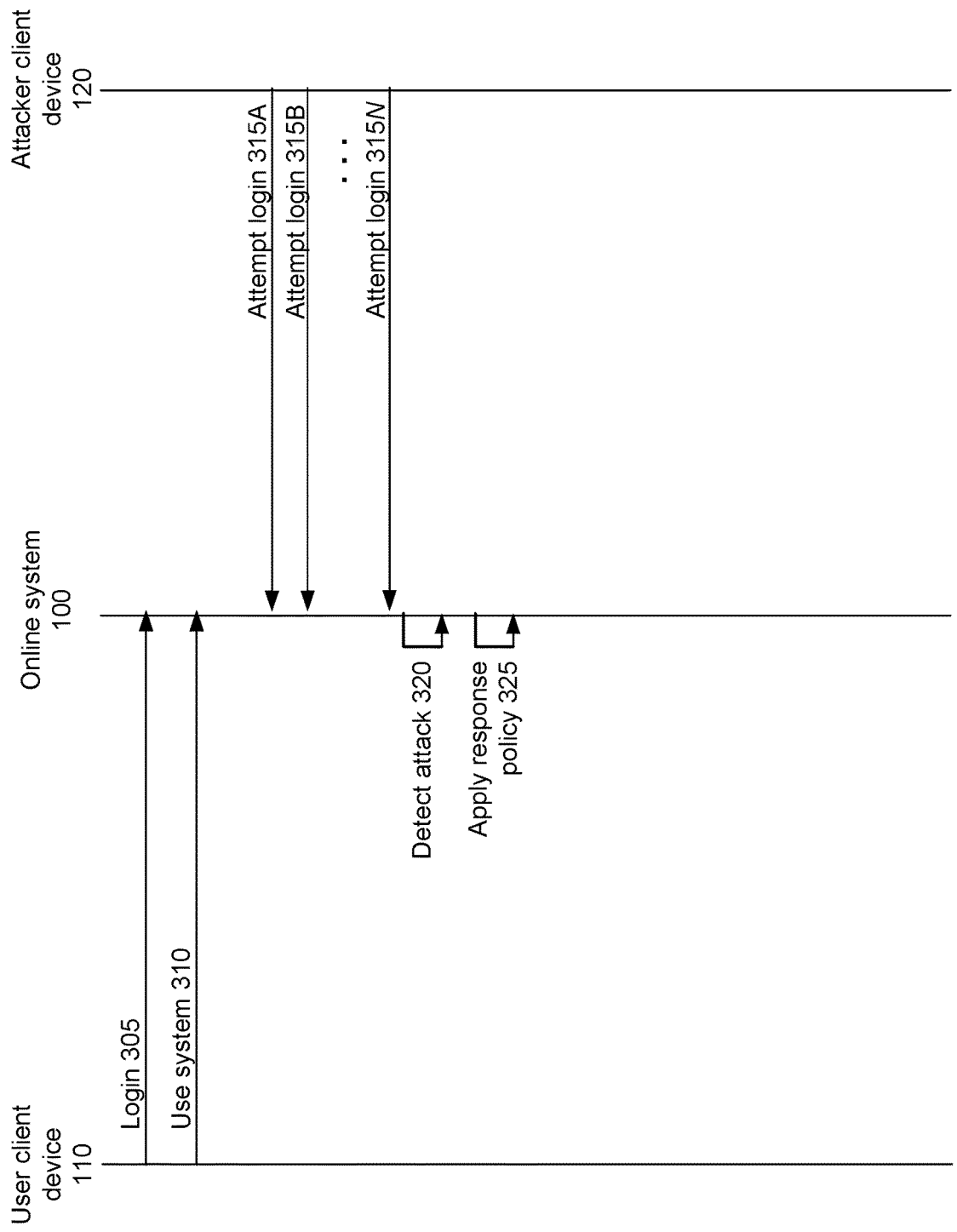
FIG. 3 illustrates example interactions between client devices and the online system of FIG. 1 as a result of system login attempts, according to one embodiment.

FIG. 3 illustrates example interactions between client devices and the online system 100 as a result of system login attempts, according to one embodiment.

A legitimate user of the online system 100 uses a client device 110 to login 305 to the online system by correctly specifying the user's credentials (e.g., username and password). Since the credentials were correct, the online system 100 grants the user with access to the user's account on the online system and its associated functionality, and the user proceeds to use 310 that functionality.

Separately, an attacker uses the attacker's client device 120 to attempt login 315 to accounts of one or more users. Since the attacker does not know the users' credential values, but rather is merely attempting common credential values, the online system eventually detects 320 that the attempted logins constitute an attack on user accounts, as discussed above with respect to the attack detection module 205. In response to detecting that the attempted logins constitute an attack on user accounts, the online system 100 applies 325 its attack response policy, as discussed above with respect to the attack response policy 210 and the attack response module 215. For example, the online system can reorder the requested MFA credential types, switch to a mode in which successful login is not permitted to the attacker, and/or log information about the attack.

Figure 4:
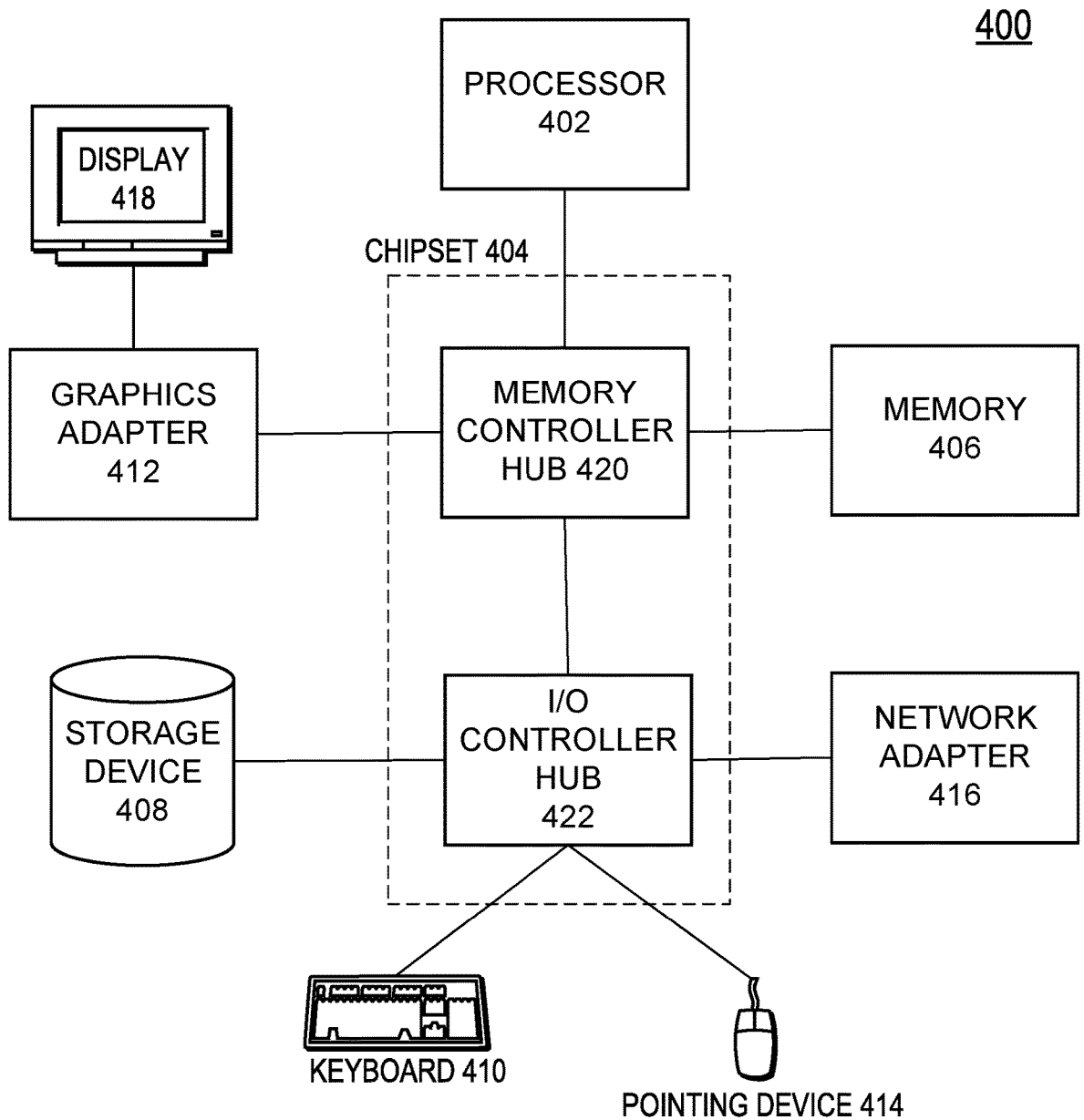
FIG. 4 is a high-level block diagram illustrating physical components of a computer used as part or all of the online system or the client devices of FIG. 1, according to one embodiment.

FIG. 4 is a high-level block diagram illustrating physical components of a computer 400 used as part or all of the online system 100 or the client devices 110, 120, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard 410 or pointing device 414. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method performed by an online system, comprising:
   determining, for an account of a user of the online system, that the user must provide a first credential type before a second credential type in order to obtain access to the account;
   receiving, from an accessing user, a request to login to the account, the request including a value of the first credential type;
   based at least in part on the value, determining that the request is likely unauthorized;
   responsive to determining that the request is likely unauthorized:
      determining that the accessing user must provide the second credential type before the first credential type in order to obtain access to the account;
      requesting the second credential type from the accessing user;
      responsive to receiving the second credential type from the accessing user, requesting the first credential type from the accessing user; and
      responsive to the first credential type and the second credential type being correct, allowing access to the account.

2. The computer-implemented method of claim 1, further comprising:
   determining that requests from a second accessing user to login to an account of a second user of the online system are likely unauthorized; and
   responsive to determining that the requests are likely unauthorized:
      continuing to accept requests to login from the second accessing user, such that login to the account of the second is denied regardless of whether values of credentials provided in the requests are correct.

3. The computer-implemented method of claim 1, further comprising:
   determining that requests from a second accessing user to login to an account of a second user of the online system are likely unauthorized; and
   responsive to determining that the requests are likely unauthorized:
      logging information about the requests to login.

4. The computer-implemented method of claim 3, wherein the information comprises one or more of IP addresses of the requests, time of the requests, frequency of the requests, and whether the request was submitted via an API or a graphical user interface, the computer-implemented method further comprising:
 training a model by providing the information as feature input to a supervised machine learning algorithm, the model when applied to feature input of login requests indicating whether the login requests are likely unauthorized.

5. The computer-implemented method of claim 3, wherein the information comprises credential values submitted along with the requests, the computer-implemented method further comprising:
 identifying, as common credential values, ones of the credential values submitted with at least a threshold frequency;
 receiving a request from a user to change a credential value of the user to one of the identified common credential values; and
 rejecting the request of the user to change the credential value of the user to the one of the identified common credential values.

6. The computer-implemented method of claim 5, further comprising:
 identifying users to whose accounts login was requested using one of the identified common credential values;
 determining, based on the identified users, properties defining a user group being attacked; and
 implementing a defensive policy measure to accounts of users of the user group.

7. The computer-implemented method of claim 6, wherein the defensive policy measure comprises altering, for the accounts, at least one of: a number of failed login requests permitted before account locking, and a time of automatic unlocking after account locking.

8. A non-transitory computer-readable storage medium storing instructions that when executed by a computer processor perform actions comprising:
 determining, for an account of a user of an online system, that the user must provide a first credential type before a second credential type in order to obtain access to the account;
 receiving, from an accessing user, a request to login to the account, the request including a value of the first credential type;
 based at least in part on the value, determining that the request is likely unauthorized;
 responsive to determining that the request is likely unauthorized:
  determining that the accessing user must provide the second credential type before the first credential type in order to obtain access to the account;
  requesting the second credential type from the accessing user;
  responsive to receiving the second credential type from the accessing user, requesting the first credential type from the accessing user; and
  responsive to the first credential type and the second credential type being correct, allowing access to the account.

9. The non-transitory computer-readable storage medium of claim 8, the instructions further comprising:
 determining that requests from a second accessing user to login to an account of a second user of the online system are likely unauthorized; and
 responsive to determining that the requests are likely unauthorized:
  continuing to accept requests to login from the second accessing user, such that login to the account of the second is denied regardless of whether values of credentials provided in the requests are correct.

10. The non-transitory computer-readable storage medium of claim 8, the instructions further comprising:
 determining that requests from a second accessing user to login to an account of a second user of the online system are likely unauthorized; and
 responsive to determining that the requests are likely unauthorized:
  logging information about the requests to login.

11. The non-transitory computer-readable storage medium of claim 10, wherein the information comprises one or more of IP addresses of the requests, time of the requests, frequency of the requests, and whether the request was submitted via an API or a graphical user interface, the computer-implemented method further comprising:
 training a model by providing the information as feature input to a supervised machine learning algorithm, the model when applied to feature input of login requests indicating whether the login requests are likely unauthorized.

12. The non-transitory computer-readable storage medium of claim 10, wherein the information comprises credential values submitted along with the requests, the computer-implemented method further comprising:
 identifying, as common credential values, ones of the credential values submitted with at least a threshold frequency;
 receiving a request from a user to change a credential value of the user to one of the identified common credential values; and
 rejecting the request of the user to change the credential value of the user to the one of the identified common credential values.

13. The non-transitory computer-readable storage medium of claim 12, the instructions further comprising:
 identifying users to whose accounts login was requested using one of the identified common credential values;
 determining, based on the identified users, properties defining a user group being attacked; and
 implementing a defensive policy measure to accounts of users of the user group.

14. The non-transitory computer-readable storage medium of claim 13, wherein the defensive policy measure comprises altering, for the accounts, at least one of: a number of failed login requests permitted before account locking, and a time of automatic unlocking after account locking.

15. An online system comprising:
 a computer processor; and
 a non-transitory computer-readable storage medium storing instructions that when executed by a computer processor perform actions comprising:
  determining, for an account of a user of the online system, that the user must provide a first credential type before a second credential type in order to obtain access to the account;
  receiving, from an accessing user, a request to login to the account, the request including a value of the first credential type;
  based at least in part on the value, determining that the request is likely unauthorized;

responsive to determining that the request is likely unauthorized:
  determining that the accessing user must provide the second credential type before the first credential type in order to obtain access to the account;
  requesting the second credential type from the accessing user;
  responsive to receiving the second credential type from the accessing user, requesting the first credential type from the accessing user; and
  responsive to the first credential type and the second credential type being correct, allowing access to the account.

16. The online system of claim 15, the instructions further comprising:
  determining that requests from a second accessing user to login to an account of a second user of the online system are likely unauthorized; and
  responsive to determining that the requests are likely unauthorized:
    continuing to accept requests to login from the second accessing user, such that login to the account of the second is denied regardless of whether values of credentials provided in the requests are correct.

17. The online system of claim 15, the instructions further comprising:
  determining that requests from a second accessing user to login to an account of a second user of the online system are likely unauthorized; and
  responsive to determining that the requests are likely unauthorized:
    logging information about the requests to login.

18. The online system of claim 17, wherein the information comprises one or more of IP addresses of the requests, time of the requests, frequency of the requests, and whether the request was submitted via an API or a graphical user interface, the computer-implemented method further comprising:
  training a model by providing the information as feature input to a supervised machine learning algorithm, the model when applied to feature input of login requests indicating whether the login requests are likely unauthorized.

19. The online system of claim 17, wherein the information comprises credential values submitted along with the requests, the computer-implemented method further comprising:
  identifying, as common credential values, ones of the credential values submitted with at least a threshold frequency;
  receiving a request from a user to change a credential value of the user to one of the identified common credential values; and
  rejecting the request of the user to change the credential value of the user to the one of the identified common credential values.

20. The online system of claim 19, the instructions further comprising:
  identifying users to whose accounts login was requested using one of the identified common credential values;
  determining, based on the identified users, properties defining a user group being attacked; and
  implementing a defensive policy measure to accounts of users of the user group.

* * * * *